(12) United States Patent
Lottini et al.

(10) Patent No.: US 7,963,011 B2
(45) Date of Patent: Jun. 21, 2011

(54) FITTING SYSTEM FOR SECURING A PANEL TO A WALL OR CEILING

(76) Inventors: Roberto Lottini, Miami, FL (US); Florenzo Bandecchi, Vicopisano (IT); Enrico Ciacchini, S. Giovanni alla Vena (IT)

( * ) Notice: Subject to any disclaimer, the term of this patent is extended or adjusted under 35 U.S.C. 154(b) by 747 days.

(21) Appl. No.: 11/927,147

(22) Filed: Oct. 29, 2007

(65) Prior Publication Data

US 2008/0178437 A1 Jul. 31, 2008

Related U.S. Application Data

(60) Provisional application No. 60/864,700, filed on Nov. 7, 2006, provisional application No. 60/855,515, filed on Oct. 30, 2006.

(51) Int. Cl.
*A44B 17/00* (2006.01)
(52) U.S. Cl. ............... 24/683; 24/620; 24/686; 24/691; 52/506.05
(58) Field of Classification Search ............ 24/620, 24/621, 683, 686, 691; 52/506.05
See application file for complete search history.

(56) References Cited

U.S. PATENT DOCUMENTS

| | | | | | |
|---|---|---|---|---|---|
| 2,100,635 | A | * | 11/1937 | De Vries Abraham | 24/621 |
| 3,916,756 | A | * | 11/1975 | Yoda | 24/682.1 |
| 4,497,093 | A | * | 2/1985 | Haberkorn | 24/595.1 |
| 5,947,509 | A | * | 9/1999 | Ricks et al. | 280/728.2 |
| 2003/0097738 | A1 | * | 5/2003 | Hilgers et al. | 24/682.1 |

* cited by examiner

*Primary Examiner* — James R Brittain
(74) *Attorney, Agent, or Firm* — Daniel S. Polley, P.A.

(57) ABSTRACT

A fitting system for securing a panel to a wall frame having a first member removably secured to a second member. The first receiving member includes an outer flange with a center aperture and a ring-like member extending backwards from a bottom surface of the flange to define a receiving passageway. The flange has a plurality of apertures for securing the first member to the wall frame with the ring-like member disposed within a recess in the wall frame. The second insertion member includes an outer flange and a male insertion portion. The outer flange is used to secure the second member to the panel. The male member is adjustable making its insertion within the receiving passageway easier. Attachment clips of the second member mate with an inner ledge of the receiving passageway to lock the two members together and thus secure the panel to the wall frame.

26 Claims, 7 Drawing Sheets

SECTION

FIG. 1
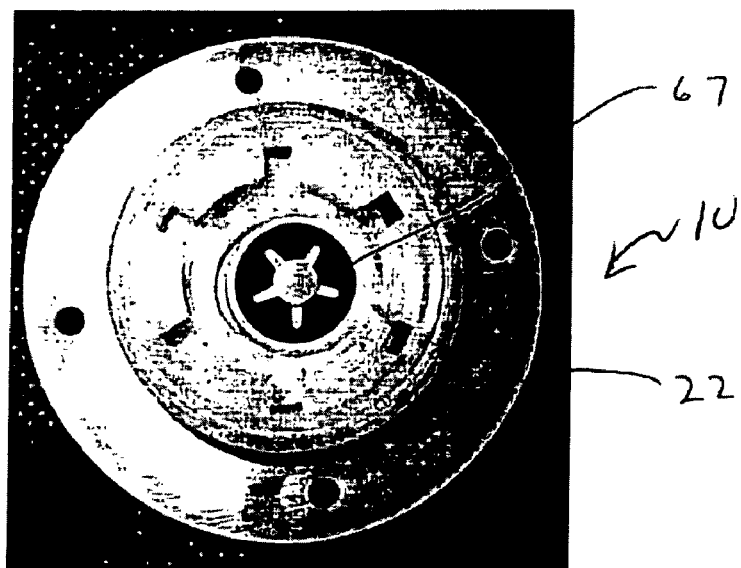
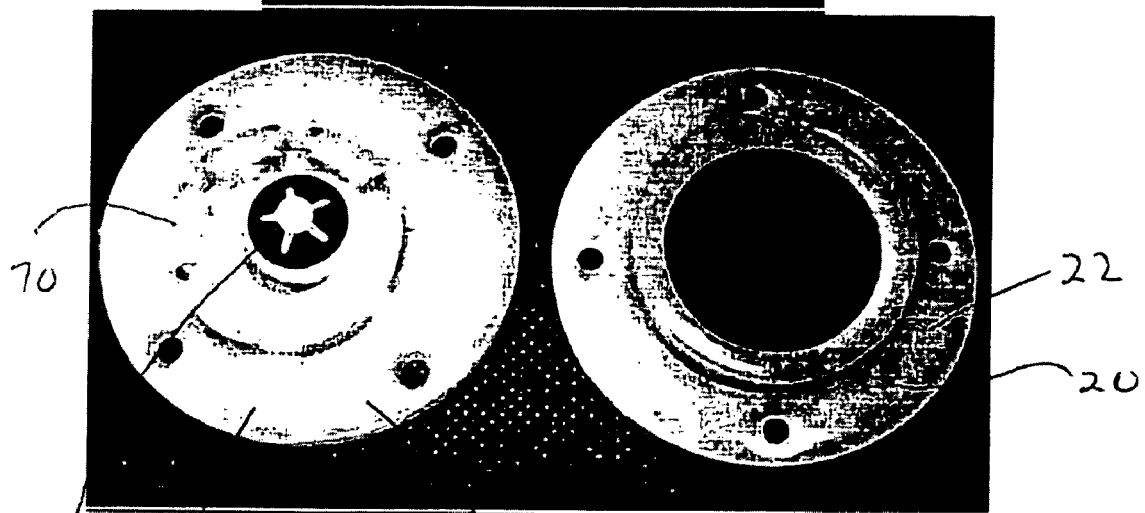
FIG. 2              FIG. 3

SPACER

LOCK-WASHER

SECTION

FITTING SYSTEM FOR SECURING A PANEL TO A WALL OR CEILING

This application claims priority to and the benefit of U.S. Application Ser. No. 60/864,700, filed Nov. 7, 2006, and U.S. Application 60/855,515, filed Oct. 30, 2006, both applications are incorporated by reference in their entireties.

FIELD OF THE INVENTION

The present invention relates to fitting systems for attaching or securing a panel to a wall or ceiling.

BACKGROUND OF THE INVENTION

Currently for securing panels to yacht wall frames and yacht ceiling frames, hook and loop fasteners are provided on the frames and panels for removable securement of the panel to the frame. The present invention provides a superior removable securement fitting system for such purpose, as well as for, securing other items to each other.

SUMMARY OF THE INVENTION

The present invention provides a fitting system for securing a first item, such as a wall or ceiling panel, to a second item such as a wall frame or ceiling frame. The present invention fitting system generally consists of two members, preferably removably attached to each other. The first member can serve as the receiving member for receiving and removably securing to the second insertion member.

The first receiving member includes an outer circular flange body with an open center portion or center aperture. A ring-like member protrudes or extends backwards from a bottom surface of the flange body member and defines a channel/passageway for receiving an insertion portion of the second member which will discussed in more detail below. The flange body can be provided with a plurality of apertures for securing the first receiving member to the first item (e.g. wall frame, ceiling frame, etc.). In one embodiment, where the system is used for securing a panel to the wall or ceiling frame (strip of wood, 2×4 strip, piece of plywood, etc.) of a yacht, the first receiving member is secured to the frame member. The center opening in the flange body is aligned with the ring member defined passageway/channel, such that they are continuous. Preferably, the above described portions of the first receiving member can be molded or otherwise monolithically formed or constructed integral as a one piece receiving member.

A portion of the frame member can be constructed from wood or other material which can have a recess or cut out made corresponding to the length of the ring like receiving portion and slightly larger in diameter to the diameter of the ring like receiving portion. To secure the first receiving member to the frame (after the cut or recess has been made), the ring like member is inserted within the recess, which causes the bottom surface of the flange body to be flush against the outer surface of the frame. Attachment screws or other fasteners are then inserted through the apertures to secure the first receiving member to the frame. Though four apertures and corresponding fasteners are used for securing first receiving member to the frame, it should be recognized that such number of apertures is not considered limiting and other number of apertures and corresponding fasteners (i.e. 3, 5, etc.) can be used and are considered within the scope of the invention.

A first portion of the receiving channel/passageway defined by the ring like member can be provided a smaller inner diameter as compared to the remaining inner diameter portion of the channel/passageway. This reduced diameter creates a ledge portion within the passageway whose purpose will be described further below.

The second insertion member also contains a flange body member ("second flange body" to distinguish), which can be similar in shape and size to the flange body member of the first receiving member. However, the second flange body preferably does not have an open center area. Rather, a post member protrudes outward from the top surface of the second flange body. The post member consists of a first portion having a first diameter and a second outer second portion having a diameter larger then the diameter of the first post portion. A peg like member can be provided at the outer end of the second post portion, which can be provided to retain a spring member in place.

The spring member is secured to the outer post portion by the peg member. The spring member causes the second post portion to apply pressure inward to the second body flange due to the compression of the spring. A movable or adjustable male insertion portion is secured to the post member and moved and adjusted with respect to the post from a fully centered to one of many offset positions, as needed. The compression from the spring forcing second post portion slightly inward to make contact with a bottom area of the male insertion portion and to create a friction relationship between a bottom area and the second post portion. The friction fit, prevents completely free movement of the male insertion portion with respect to the post portion which could make adjustments and positioning of the male insertion portion hard to control.

The bottom area of the male insertion portion can include a center opening for which the post portion in inserted therethrough. The diameter of the second post portion can be slightly larger then the diameter of the bottom area opening of the male insertion portion such that the insertion portion cannot be removed from its movable/adjustable securement/relationship with respect to the post portion. However, the diameter of the first post portion can be somewhat reduced compared to the diameter or size of bottom area opening such that the insertion member can be moved and adjusted in position with respect to the post portion, while at the same time being frictionally abutting the second post portion (in view of the force applied by the secured spring) to help maintain or retain the adjusted or desired position of the male insertion portion with the respect to the post member.

Extending upward from the bottom portion of the insertion member is a ring-like member having a plurality of slots to define a plurality of attachment clips. A ledge or lip can be provided near the top outer end of each attachment clip. Furthermore, the top portion of each attachment clip can be slightly beveled or angled which will aid when inserting into the receiving member. Similarly, a first end of the receiving channel (closest to the outer flange body) of the first receiving member can also be slightly angled or beveled to also aid the first receiving member in receiving the second insertion member.

A plurality of apertures can also be provided on the second flange body similar to the outer flange body of the first receiving member for securing the male insertion member to a wall or ceiling panel, or whatever item is to be secured.

When inserting the male insertion portion within the receiving area, the attachment clips are disposed within the channel. The length of the attachment clips are sufficient such that the top edge/ledge/lip of the retaining attachment clips extend beyond the smaller inner diameter portion of the receiving channel and mate with the ledge of the channel defined by the different size of inner diameters for the receiving channel. This mating relationship of the two ledges helps to retain the male insertion member within the receiving member. However, given that the overlap in the ledges is not a relatively large amount, with enough force and because the male insertion portion can be slightly moved, the second insertion member can be removed from it's attachment to the first receiving member.

Each connection or attachment of the first and second members can withstand approximately thirty pounds of weight, though such is not considered limiting. Preferably, a plurality of fitting systems will be used to connect a panel to the frame. However, the invention is not considered limited to any particular number of fitting systems. The number of fitting systems required can depend on the size or weight of the panel or other item that is to be secured.

When exact positioning or spacing between the first receiving members do not correspond exactly to the spacing between the second insertion members, the ability to slightly adjust the position of the insertion portion with respect to the post portion may be sufficient to have the two spacing between equal and permit attachment of the panel to the frame. Thus, by being able to slightly adjust the insertion portions as described above, any differences in corresponding spacing between the second male members and the first receiving members can be compensated for and overcome by slight adjustment of one or more of the male insertion portions taken into consideration the movement restrictions or limitations created by the size of the bottom area opening and the post portion. Additionally, by providing a plurality of slots in the ring-like male insertion member to create a plurality of attachment clips, slight tolerance or give is provided for the retaining clips which can also aid in attaching and detaching the second insertion member to the first receiving member.

BRIEF DESCRIPTION OF THE DRAWINGS

FIG. 1 is a top view illustrating the fitting system in accordance with the present invention;

FIG. 2 is a perspective view of the male member of the fitting system of FIG. 1;

FIG. 3 is a perspective view of the female member of the fitting system of FIG. 1;

DESCRIPTION OF THE INVENTION

Figure 4:
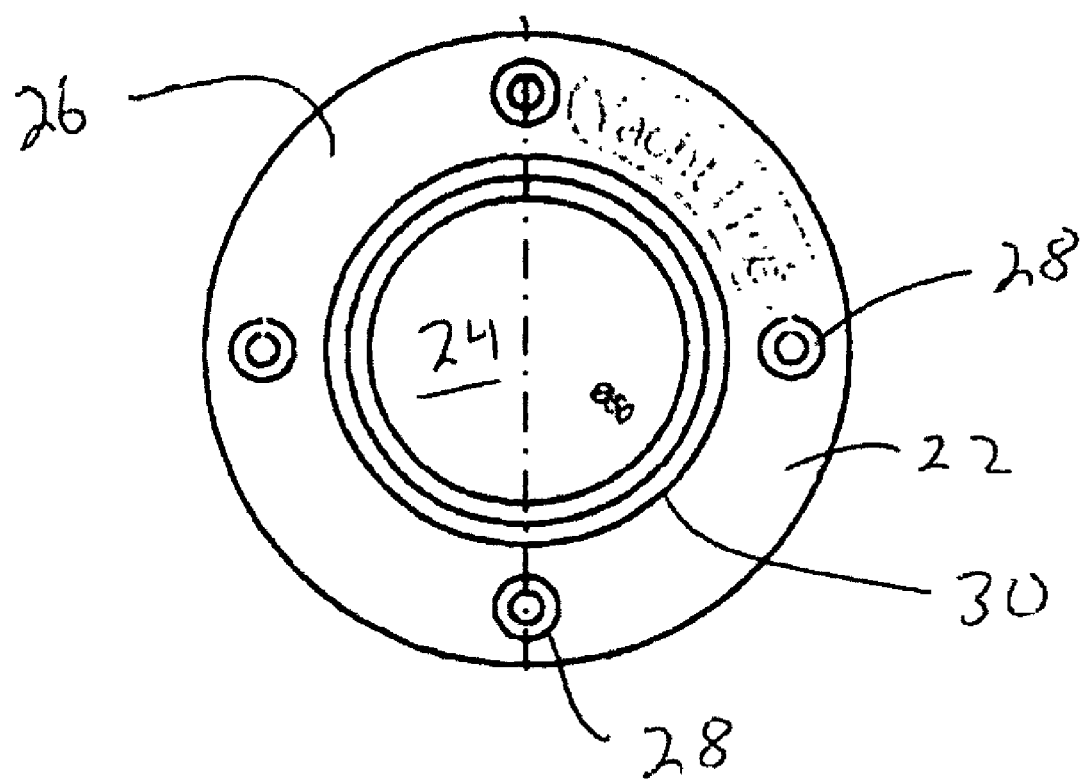
FIG. 4 is a top view of the female member of FIG. 3.
Figure 5:
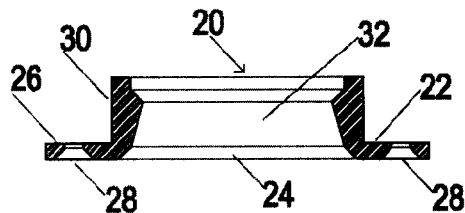
FIG. 5 is a side sectional view of the female member of FIG. 3.
Figure 7:
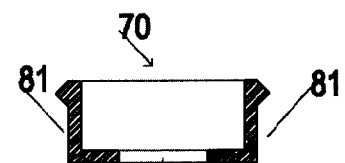
FIG. 7 is a side sectional view of an elastic insert portion of the male member of FIG. 2.
Figure 6:
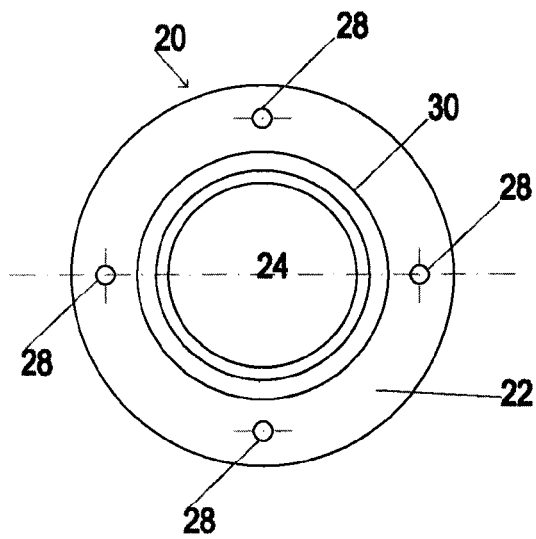
FIG. 6 is a bottom view of the female member of FIG. 3.
Figure 8:
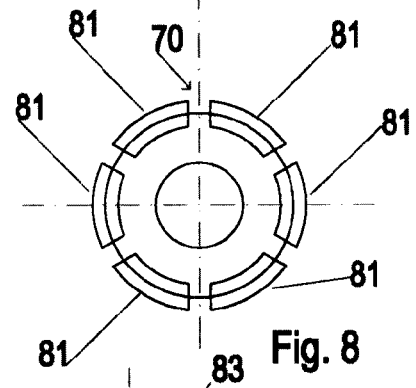
FIG. 8 is a top view of the elastic insert portion of FIG. 7.
Figure 10:
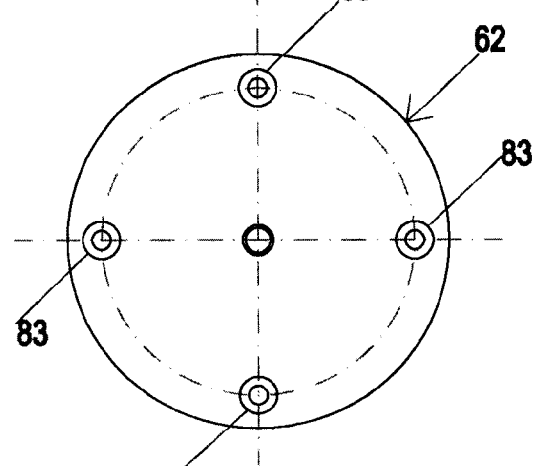
FIG. 10 is a top view of the support or base portion of FIG. 9.
Figure 9:
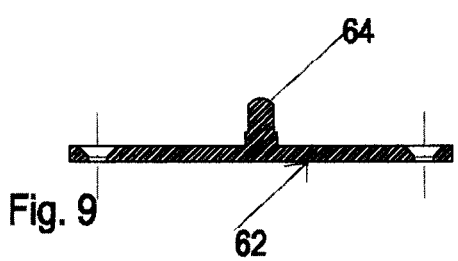
FIG. 9 is a side sectional view of the support or base portion of the male member of FIG. 2.
Figure 11:
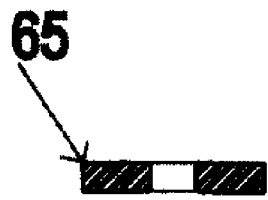
FIG. 11 is a side sectional view of the spacer portion of the male member of FIG. 2.
Figure 13:
FIG. 13 is a side sectional view of the lock/washer portion of the male member of FIG. 2.
Figure 12:
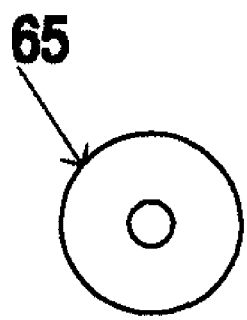
FIG. 12 is a top view of the spacer portion of FIG. 11.
Figure 14:
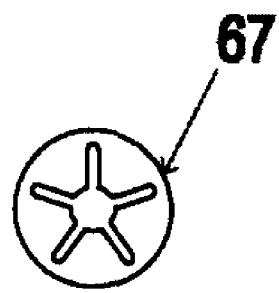
FIG. 14 is a top view of the lock/washer portion of FIG. 13.
Figure 15:
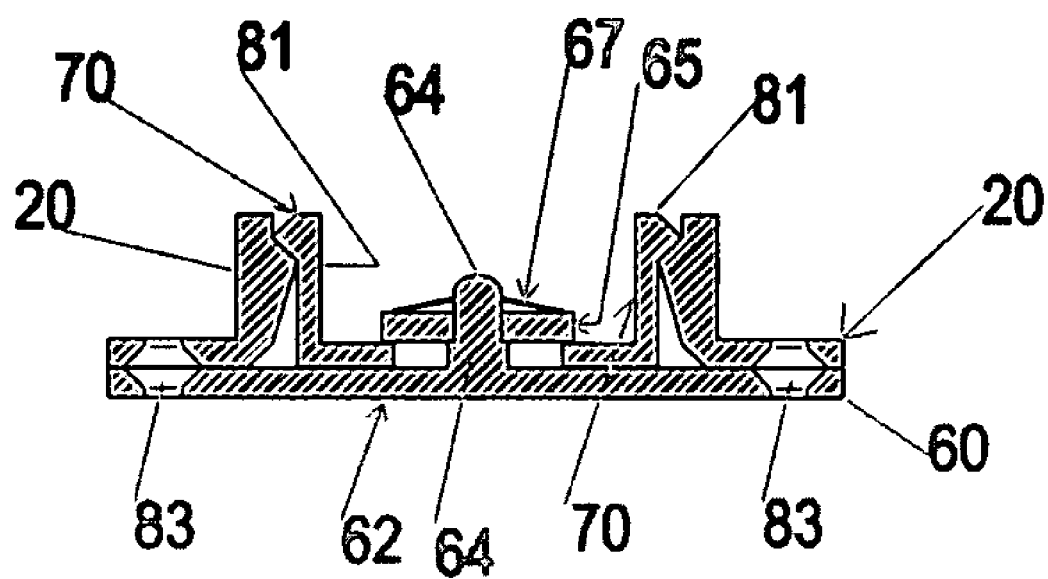
FIG. 15 is a side sectional view showing the male member secured to or fitted together with the female member in accordance with the present invention.
Figure 16:
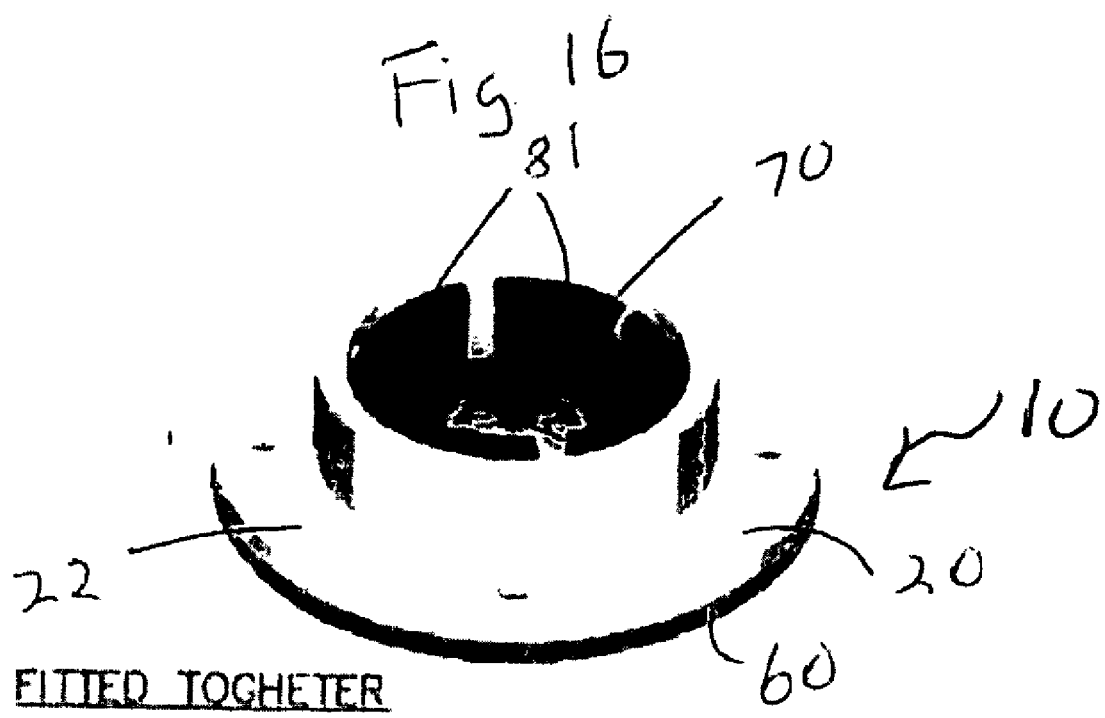
FIG. 16 is a perspective view showing the male member secured to or fitted together with the female member in accordance with the present invention.

As seen in the drawing figures, the present invention provides a fitting system generally designated as reference numeral 10 for securing a first item, such as a wall or ceiling panel, to a second item such as a wall frame or ceiling frame. The present invention fitting system generally consists of two members 20 and 60, preferably removably attached to each other. The first member 20 can serve as a receiving or female member for receiving and removably securing to the second insertion or male member 60.

Figure 17:
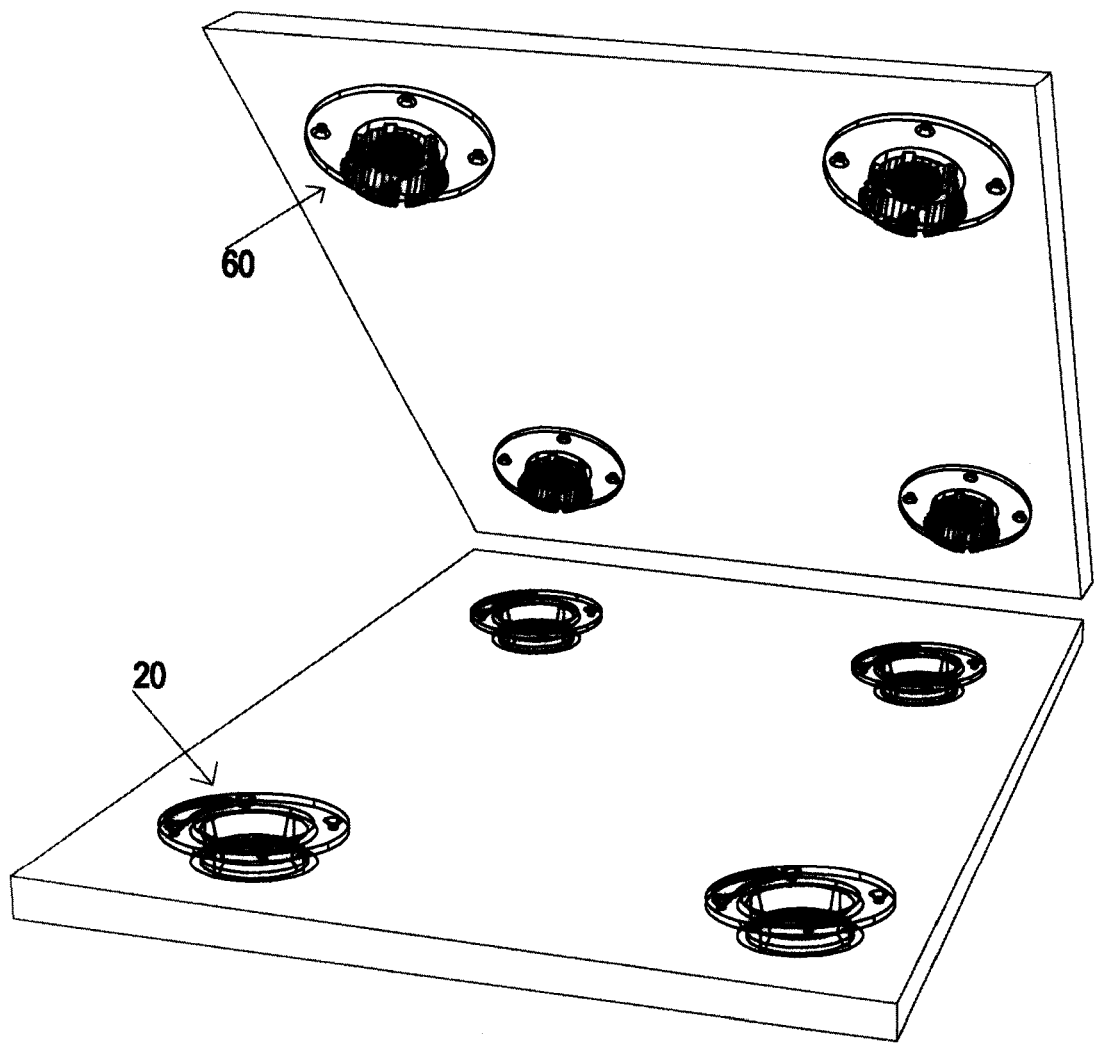
FIG. 17 is a perspective view showing the members of the present invention secured to a panel.

As best seen in FIGS. 2 through 4, first receiving member 20 includes an outer circular flange body 22 with an open center portion or center aperture 24. A ring-like or circular member 30 protrudes or extends backwards from a bottom surface 26 of flange body member 22 and defines a channel/passageway 32 for receiving an insertion portion or insert 70 of second member 60 which will discussed in more detail below. Flange body 22 can be provided with a plurality of apertures 28 for securing first receiving member 20 to the first item (e.g. wall frame, ceiling frame, etc.—See FIG. 17). In one embodiment, where the system is used for securing a panel to the wall or ceiling frame (strip of wood, 2×4 strip, piece of plywood, etc.) of a yacht, first receiving member 20 is secured to the frame member. Center opening 24 defined be flange body 22 is aligned with the ring member defined passageway/channel 32, such that they are continuous. Preferably, the above described portions of the first receiving member can be molded or otherwise monolithically formed as a one piece receiving member 20.

A portion of the frame member can be constructed from wood or other material which can have a recess or cut out made corresponding to the dimensions of ring-like receiving portion 30 and at least slightly larger in diameter to the diameter of the ring-like receiving portion 30, such that the receiving portion 30 can be disposed within the recess. To secure first receiving member 20 to the frame (after the cut or recess has been made), ring-like member 30 is inserted within the recess, which causes bottom surface 26 of flange body 22 to be flush against the outer surface of the frame (or other item that receiving member 20 is secured to). Attachment screws or other fasteners are then inserted through apertures 28 to secure first receiving member 20 to the frame. Though four apertures 28 and corresponding fasteners are shown and can be used for securing first receiving member 20 to the frame, it should be recognized that such number of apertures 28 is not considered limiting and other number of apertures 28 and corresponding fasteners (i.e. 3, 5, etc.) can be used and are considered within the scope of the invention. Additionally, other fastening mechanisms can also be used, which may eliminate the need for apertures 28. These other fastening mechanisms are also considered within the scope of the invention.

A first portion of receiving channel/passageway 32 defined by the ring-like member 30 can be provided with a smaller inner diameter as compared to the remaining inner diameter portion of channel/passageway 32. This reduced diameter creates an internal or inner ledge portion 31 within passageway 32 whose purpose will be described further below.

The second insertion member also contains a flange body member 62 ("second flange body" to distinguish), which can be similar in shape and size to the flange body member of the first receiving member. However, the second flange body 62 preferably does not have an open center area. Rather, a post member 64 protrudes outward or upward from the top surface of second flange body 62. The post member consists of a first portion having a first diameter and a second outer top portion or spacer 65 having a diameter larger then the diameter of the first post portion. A peg like member can be provided at the outer end of the second post portion, which can be provided to retain a spring member or washer 67 in place.

The spring member or washer 67 (collectively referred to as "spring" or "spring member") is secured to the outer post portion by the peg member. The spring member causes the second post portion to apply pressure inward to the second body flange due to the compression of the spring. A movable or adjustable male insertion portion or insert 70 is secured to the post member and moved and adjusted with respect to the post from a fully centered to one of many offset positions, as needed. The compression from the spring 67 forces second post (top) portion/spacer 65 slightly inward to make contact with a bottom area of the male insertion portion 70 and to create a friction relationship between a bottom area and the second post portion. The friction fit, prevents completely free movement of male insertion portion 70 with respect to the post portion 64 which could make adjustments and positioning of the male insertion portion hard or relatively harder to control or accomplish.

The bottom area of the male insertion portion can include a center opening for which the post portion in inserted therethrough. The diameter of the second post portion can be slightly larger then the diameter of the bottom area opening of the male insertion portion such that the insertion portion can not be removed from its movable/adjustable securement/relationship with respect to the post portion. However, the diameter of the first post portion can be somewhat reduced compared to the diameter or size of bottom area opening such that the insertion member can be moved and adjusted in position with respect to the post portion, while at the same time being frictionally abutting the second post portion (in view of the force applied by the secured spring) to help maintain or retain the adjusted or desired position of the male insertion portion with the respect to the post member.

Extending upward from the bottom portion of the insertion member is a ring-like member having a plurality of slots to define a plurality of attachment clips 81, which are preferably somewhat elastic to allow certain movement. A ledge can be provided near the top outer end of each attachment clip. Furthermore, the top portion of each attachment clip can be slightly beveled or angled which will aid when inserting into the receiving member. Similarly, a first end of the receiving channel (closest to the outer flange body) of the first receiving member can also be slightly angled or beveled to also aid the first receiving member in receiving the second insertion member.

A plurality of apertures 83 can also be provided on the second flange body 62 similar to the outer flange body 22 of the first receiving member 20 for securing the male insertion member to a wall or ceiling panel, or whatever item is to be secured. Though not preferred, the first receiving member could be secured to the panel, while the second insertion member is secured to the frame. For such reverse attachment order, the recess or cutout would then be made in the wall or ceiling panel. However, the preferred embodiment has the first receiving member being secured to the frame and the second insertion member being secured to the panel.

In the preferred embodiment, when securing to the panel, the back surface is where the second insertion member is secured and when securing to the frame the recess/cutout is made in the outer face surface of the frame for receipt and securement of the first receiving member.

When inserting the male insertion portion within the receiving area, the attachment clips are disposed within the channel. The length of the attachment clips are sufficient such that the top edge/ledge of the retaining attachment clips goes extend beyond the smaller inner diameter portion of the receiving channel and mate with the ledge of the channel defined by the different size of inner diameters for the receiving channel. This mating relationship of the two ledges helps to retain the male insertion member within the receiving member. However, given that the overlap in the ledges is not a relatively large amount, with enough force and because the male insertion portion can be slightly moved, the second insertion member can be removed from it's attachment to the first receiving member.

Each connection or attachment of the first and second members can withstand approximately thirty pounds of weight, though such is not considered limiting. Preferably, a plurality of fitting systems will be used to connect a panel to the frame. However, the invention is not considered limited to any particular number of fitting systems. The number of fitting systems required can depend on the size of the panel or other item that is to be secured.

When exact positioning or spacing between the first receiving members do not correspond exactly to the spacing between the second insertion members, the ability to slightly adjust the position of the insertion portion with respect to the post portion may be sufficient to have the two spacing between equal and permit attachment of the panel to the frame. Thus, by being able to slightly adjust the insertion portions as described above, any differences in corresponding spacing between the second male members and the first receiving members can be compensated for and overcome by slight adjustment of one or more of the male insertion portions taken into consideration the movement restrictions or limitations created by the size of the bottom area opening and the post portion. Additionally, by providing a plurality of slots in the ring-like male insertion member to create a plurality of attachment clips, slight tolerance or give is provided for the retaining clips which can also aid in attaching and detaching the second insertion member to the first receiving member.

In one non-limiting embodiment, when the panel is secured to the frame, a gap or space of approximately ¼" can be provided between the panel and frame. The gap or space can aid in providing a gripping area for detaching the securement of the panel to the frame. The approximate ¼" space is by way of example only and should not be considered limiting. Additionally, other dimensions smaller and larger than the approximate ¼" dimensions can be used and are considered within the scope of the invention.

The first and second members can be constructed from various types of materials, such as, but limited to, plastics and other polymers. One non-limiting material which can be use for the first and second members is manufactured by the BASF Chemical Company and sold under the trademark ULTRAFORM. However, the present invention is not considered limited to this material or any and other material and other materials and brands of materials can used and are considered within the scope of the invention.

While the present invention members are preferably circular in shape, including their insertion and receiving portions, such shape is not considered limiting and other shapes can be used and are considered within the scope of the invention. Additionally, the present invention is not considered to any particular dimensions and can be constructed in various sizes, in addition to the various shapes, all of which are considered within the scope of the invention.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A fastening system for securing a first item to a second item comprising: a first receiving member having a first outer flange portion and a back portion extending outward from said first outer flange portion, said first outer flange portion and said back portion each having a central aperture which defines a receiving passageway, wherein a portion of said receiving passageway defined by said back portion having a larger diameter than a remaining portion of said receiving passageway to define an inner ledge within said receiving passageway adjacent a non-receiving end of said receiving passageway, said first receiving member adapted for securement to a first object; and a second insertion member adapted for securement to a second object, said second insertion member having a second outer flange portion with a central non-movable post member and a male insertion portion secured to said second outer flange portion and movable around said central post member after said second insertion member has been secured to the second object and when securing said second insertion member to said first receiving member, said male insertion portion having a plurality of attachment clip sections with each clip section having an overhang for mating with a portion of said inner ledge when said male insertion portion is received within said receiving passageway to secure said first object to said second object.

2. The fastening system of claim 1 wherein said first outer flange portion having a plurality of apertures and said second outer flange portion having a plurality of apertures.

3. The fastening system of claim 1 wherein said central aperture of said first outer flange portion is at least slightly angled to permit easier acceptance of said male insertion portion.

4. The fastening system of claim 1 further comprising means for asserting pressure on said male insertion portion to cause its resistance to free movement of said mail insertion portion around said central post member.

5. A fastening system for securing a first item to a second item comprising:
a first receiving member having a first outer flange portion and a back portion extending outward from said first outer flange portion, said first outer flange portion and said back portion each having a central aperture which defines a receiving passageway, wherein a portion of said receiving passageway defined by said back portion having an inner ledge, said first receiving member adapted for securement to a first object;
a second insertion member adapted for securement to a second object, said second insertion member having a second outer flange portion with a central post member and a male insertion portion secured to said second outer flange portion and adjustable around said central post member, said male insertion portion having a plurality attachment clip sections with each clip section having an overhang for mating with a portion of said inner ledge when said male insertion portion is received within said receiving passageway to secure said first object to said second object; and
means for asserting pressure on said male insertion portion to cause its resistance to free movement of said mail insertion portion around said central post member;
wherein said means for asserting pressure is a top surface portion of said central post member and a spring member disposed on said top surface portion; wherein said male insertion portion having a bottom surface with a centrally located aperture with said central post member extending through said centrally located aperture of said male insertion portion; wherein the diameter of said top surface portion is at least slightly larger than the diameter of said centrally located aperture to retain said male insertion portion to said second outer flange portion; wherein said spring causing pressure to be applied to said top surface portion which applies pressure on the bottom surface of said male insertion portion to prevent unrestricted movement of said male insertion member along said central post member.

6. A fastening system for securing a first item to a second item comprising:
a first receiving member having a first outer flange portion and a back portion extending outward from said first outer flange portion, said first outer flange portion and said back portion each having a central aperture which defines a receiving passageway, wherein a portion of said receiving passageway defined by said back portion having an inner ledge, said first receiving member adapted for securement to a first object;
a second insertion member adapted for securement to a second object, said second insertion member having a second outer flange portion with a central post member and a male insertion portion secured to said second outer flange portion and adjustable around said central post member, said male insertion portion having a plurality attachment clip sections with each clip section having an overhang for mating with a portion of said inner ledge when said male insertion portion is received within said receiving passageway to secure said first object to said second object;
wherein said central post member having a top surface portion and a spring member disposed on said top surface portion; wherein said male insertion portion having a bottom surface with a centrally located aperture with said central post member extending through said centrally located aperture of said male insertion portion; wherein the diameter of said top surface portion is at least slightly larger than the diameter of said centrally located aperture to retain said male insertion portion to said second outer flange portion; wherein said spring causing pressure to be applied to said top surface portion which applies pressure on the bottom surface of said male insertion portion to prevent unrestricted movement of said male insertion member along said central post member.

7. The fastening system of claim 1 wherein said first object is a wall or ceiling frame, wherein said back portion is disposed within a recess in said wall or ceiling frame and said first outer flange portion is flush with an outer surface of said wall or ceiling frame when said first receiving member is secured to said wall or ceiling frame; wherein said second object is a panel member to be secured to said wall or ceiling frame; wherein said second outer flange portion is flush with a bottom or inner surface of said panel when said second insertion member is secured to said panel; wherein when said panel is secured to said wall or ceiling frame said fastening system is hidden from normal view.

8. The fastening system of claim 1 wherein said first outer flange portion is substantially circular in shape.

9. The fastening system of claim 1 wherein said second outer flange portion is substantially circular in shape.

10. The fastening system of claim 1 wherein said first outer flange portion and said second outer flange portion are both substantially circular in shape.

11. The fastening system of claim 3 wherein said plurality of clips each having an angled top surface corresponding to the shape of said angle of said central aperture of said first circular outer flange portion.

12. The fastening system of claim 10 wherein an outer diameter of said first outer flange portion is substantially the same as an outer diameter of said second outer flange portion.

13. A fastening system for securing a first item to a second item comprising: a first receiving member having a first circular outer flange portion and a circular back portion extending outward from said outer flange, said outer flange portion and said back portion each having a central aperture which defines a receiving passageway, wherein a portion of said receiving passageway defined by said back portion having a larger diameter than a remaining portion of said receiving passageway to define an inner ledge within said receiving passageway adjacent a non-receiving end of said receiving passageway, said first circular outer flange portion having a plurality of apertures, said first receiving member adapted for securement to a first object; and a second insertion member adapted for securement to a second object, said second insertion member having a second circular outer flange portion with a central non-movable post member and a male insertion portion secured to said second circular outer flange portion and movable around said central post member after said second insertion member has been secured to the second object and when securing said second insertion member to said first receiving member, said second circular outer flange portion having a plurality of apertures, said male insertion portion having a plurality attachment clip sections with each clip section having an overhang for mating with a portion of said inner ledge when said male insertion portion is received within said receiving passageway to secure said first object to said second object, said central non-movable post member permanently secured to said second circular outer flange portion.

14. The fastening system of claim 13 wherein said central aperture of said first circular outer flange portion is at least slightly angled to permit easier acceptance of said male insertion portion.

15. A fastening system for securing a first item to a second item comprising: a first receiving member having a first circular outer flange portion and a circular back portion extending outward from said outer flange, said outer flange portion and said back portion each having a central aperture which defines a receiving passageway, wherein a portion of said receiving passageway defined by said back portion having an inner ledge, said first circular outer flange portion having a plurality of apertures, said first receiving member adapted for securement to a first object; and a second insertion member adapted for securement to a second object, said second insertion member having a second circular outer flange portion with a central post member and a male insertion portion secured to said second circular outer flange portion and adjustable around said central post member, said second circular outer flange portion having a plurality of apertures, said male insertion portion having a plurality attachment clip sections with each clip section having an overhang for mating with a portion of said inner ledge when said male insertion portion is received within said receiving passageway to secure said first object to said second object; wherein said central post member having a top surface portion and a spring member disposed on said top surface portion; wherein said male insertion portion having a bottom surface with a centrally located aperture with said central post member extending through said centrally located aperture of said male insertion portion; wherein the diameter of said top surface portion is at least slightly larger than the diameter of said centrally located aperture to retain said male insertion portion to said second circular outer flange portion; wherein said spring causing pressure to be applied to said top surface portion which applies pressure on the bottom surface of said male insertion portion to prevent unrestricted movement of said male insertion member along said central post member.

16. The fastening system of claim 13 wherein said first object is a wall or ceiling frame, wherein said back portion is disposed within a recess in said wall or ceiling frame and said first outer flange portion is flush with an outer surface of said wall or ceiling frame when said first receiving member is secured to said wall or ceiling frame; wherein said second object is a panel member to be secured to said wall or ceiling frame; wherein said second outer flange portion is flush with a bottom or inner surface of said panel when said second insertion member is secured to said panel; wherein when said panel is secured to said wall or ceiling frame said fastening system is hidden from normal view.

17. The fastening system of claim 14 wherein said plurality of clips each having an angled top surface corresponding to the shape of said angle of said central aperture of said first circular outer flange portion.

18. The fastening system of claim 13 wherein an outer diameter of said first circular outer flange portion is substantially the same as an outer diameter of said second circular outer flange portion.

19. A fastening system for securing a first item to a second item comprising: a first receiving member having a first circular outer flange portion and a circular back portion extending outward from said outer flange, said outer flange portion and said back portion each having a central aperture which defines a receiving passageway, wherein a portion of said receiving passageway defined by said back portion having an inner ledge, said first circular outer flange portion having a plurality of apertures, said first receiving member adapted for securement to a first object; and a second insertion member adapted for securement to a second object, said second insertion member having a second circular outer flange portion with a central post member and a male insertion portion secured to said second circular outer flange portion and adjustable around said central post member, said second circular outer flange portion having a plurality of apertures, said male insertion portion having a plurality attachment clip sections with each clip section having an overhang for mating with a portion of said inner ledge when said male insertion portion is received within said receiving passageway to secure said first object to said second object; wherein said central post member having a top surface portion and a spring member disposed on said top surface portion; wherein said male insertion portion having a bottom surface with a centrally located aperture with said central post member extending through said centrally located aperture of said male insertion portion; wherein the diameter of said top surface portion is at least slightly larger than the diameter of said centrally located aperture to retain said male insertion portion to said second circular outer flange portion; wherein said spring causing pressure to be applied to said top surface portion which applies pressure on the bottom surface of said male insertion portion to prevent unrestricted movement of said male insertion member along said central post member; wherein said central aperture of said first circular outer flange portion is at least slightly angled to permit easier acceptance of said male insertion portion; wherein said plurality of clips each having an angled top surface corresponding to the shape of said angle of said central aperture of said first circular outer flange portion.

20. The fastening system of claim 19 wherein said first object is a wall or ceiling frame, wherein said back portion is disposed within a recess in said wall or ceiling frame and said first outer flange portion is flush with an outer surface of said wall or ceiling frame when said first receiving member is secured to said wall or ceiling frame; wherein said second object is a panel member to be secured to said wall or ceiling frame; wherein said second outer flange portion is flush with a bottom or inner surface of said panel when said second insertion member is secured to said panel; wherein when said panel is secured to said wall or ceiling frame said fastening system is hidden from normal view.

21. The fastening system of claim 19 wherein an outer diameter of said first circular outer flange portion is substantially the same as an outer diameter of said second outer flange portion.

22. The fastening system of claim 1 wherein said plurality of attachment clip sections forming a slotted substantially circular male insertion portion disposed around said central post member.

23. The fastening system of claim 1 wherein said central non-movable post member permanently secured to said second outer flange portion.

24. The fastening system of claim 13 wherein said plurality of attachment clip sections forming a slotted substantially circular male insertion portion disposed around said central post member.

25. The fastening system of claim 1 wherein said central non-movable post member is monolithically formed with said second outer flange portion to form a one-piece member.

26. The fastening system of claim 13 wherein said central non-movable post member is monolithically formed with said second circular outer flange portion to form a one-piece member.

* * * * *